US009436453B2

(12) United States Patent
Pillai et al.

(10) Patent No.: US 9,436,453 B2
(45) Date of Patent: Sep. 6, 2016

(54) METHOD AND SYSTEM FOR INITIALIZING OPTIONAL COMPONENTS AFTER SELF-BOOTING OF A CUSTOMIZED PRODUCT

(71) Applicant: Ericsson Inc., Plano, TX (US)

(72) Inventors: Revathi Appukuttan Pillai, Littleton, MA (US); Willy Chang, Northborough, MA (US); Jeffrey Lawrence Hemstreet, Jefferson, MA (US); Ramdas Sitaram Rao, Brighton, MA (US)

(73) Assignee: ERICSSON INC., Plano, TX (US)

( * ) Notice: Subject to any disclaimer, the term of this patent is extended or adjusted under 35 U.S.C. 154(b) by 212 days.

(21) Appl. No.: 14/075,452

(22) Filed: Nov. 8, 2013

(65) Prior Publication Data

US 2014/0129813 A1 May 8, 2014

Related U.S. Application Data

(60) Provisional application No. 61/724,196, filed on Nov. 8, 2012.

(51) Int. Cl.

| | |
|---|---|
| ***G06F 9/00*** | (2006.01) |
| ***G06F 9/24*** | (2006.01) |
| ***G06F 15/177*** | (2006.01) |
| ***G06F 9/445*** | (2006.01) |
| *G06F 9/44* | (2006.01) |

(52) U.S. Cl.
CPC .. *G06F 8/61* (2013.01); *G06F 8/71* (2013.01)

(58) Field of Classification Search
CPC .................................. G06F 8/61; G06F 8/71
See application file for complete search history.

(56) References Cited

U.S. PATENT DOCUMENTS

| | | | | |
|---|---|---|---|---|
| 7,395,534 | B2 | 7/2008 | Alcazar et al. | |
| 8,640,124 | B2 | 1/2014 | Barr et al. | |
| 2003/0084439 | A1 | 5/2003 | Perkins et al. | |
| 2003/0131226 | A1 * | 7/2003 | Spencer .................... | G06F 8/61 713/100 |
| 2006/0294041 | A1 * | 12/2006 | Baartman ................. | G06F 8/62 |

OTHER PUBLICATIONS

International Search Report dated Apr. 4, 2014 corresponding to International Patent Application No. PCT/US2013/069176; 3 pages.
Written Opinion dated Apr. 4, 2014 corresponding to International Patent Application No. PCT/US2013/069176; 7 pages.
Supplemental release notes for Windows Embedded for Point of Service dated Mar. 14, 2010 [retrieved on Mar. 13, 2014 from the internet: <http://support.microsoft.com/kb/901065; 13 pages.

* cited by examiner

*Primary Examiner* — Xuxing Chen

(57) ABSTRACT

There is provided a product that includes (i) a component, (ii) a storage device that holds a configuration code that indicates that the component is installed in the product, (iii) a processor, and (iv) a memory that contains instructions that are readable by the processor and that control the processor to (a) read the configuration code from the storage device, (b) determine from the configuration code that the component is installed in the product, thus yielding a determination, and (c) execute an operation in response to the determination.

11 Claims, 4 Drawing Sheets

METHOD AND SYSTEM FOR INITIALIZING OPTIONAL COMPONENTS AFTER SELF-BOOTING OF A CUSTOMIZED PRODUCT

BACKGROUND OF THE INVENTION

1. Field of the Invention

The present disclosure relates to a product that can be configured with optional components, and more particularly, to a product having a storage device that holds a configuration code that indicates whether an optional component is installed in the product.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

A computer-implemented product may be situated in an environment or location that is cost prohibitive to visit, or that poses a safety risk. As such, if the product needs to be rebooted, and if the reboot requires human intervention at the location of the product, the reboot would require an undesirable expenditure in the form of human labor, and a possible exposure to the safety risk. Examples of such a product include a computer device, such as a smart grid node, on an electric utility pole, or in an underwater or underground location.

Although a computer-implemented product may be designed to reboot without human intervention, i.e., self-boot, in a case where the product may include an optional component, the self-boot operation might not be practical or possible, as the product may not be able to identify whether the optional component is present. This situation is further exacerbated in a case where the product may include a plurality of optional components.

SUMMARY OF THE INVENTION

There is a need for a computer-implemented product that can self-boot even in a case where the product may include one or more optional components. An advantage of such a product is that it can be employed in an environment where it is intended to run continuously, without human intervention, and in a location that is cost-prohibitive or unsafe for a user to visit in order to reboot the product.

To fulfill the above-noted need, there is provided a method that includes (i) reading a configuration code from a storage device that is included in a product, wherein the configuration code indicates whether a component is installed in the product, (ii) determining from the configuration code whether the component is installed in the product, thus yielding a determination, and (iii) executing an operation in response to the determination.

There is also provided a product that includes (i) a component, (ii) a storage device that holds a configuration code that indicates that the component is installed in the product, (iii) a processor, and (iv) a memory that contains instructions that are readable by the processor and that control the processor to (a) read the configuration code from the storage device, (b) determine from the configuration code that the component is installed in the product, thus yielding a determination, and (c) execute an operation in response to the determination.

There is also provided a storage medium that is tangible and comprises instructions that are readable by a processor to cause the processor to (i) read a configuration code from a storage device that is included in a product, (ii) determine from the configuration code that a component is installed in the product, thus yielding a determination, and (iii) execute an operation in response to the determination.

There is also provided a method that includes (i) installing a component into a product, and (ii) writing to a storage device in the product, a configuration code that indicates that the component is installed in the product.

There is also provided a system that includes (i) a processor, and (ii) a memory that contains instructions that are readable by the processor, and that control the processor to (a) install a component into a product, and (b) write to a storage device in the product, a configuration code that indicates that the component is installed in the product.

There is also provided a storage medium that is tangible and comprises instructions that are readable by a processor to cause the processor to (a) install a component into a product, and (b) write to a storage device in the product, a configuration code that indicates that the component is installed in the product.

BRIEF DESCRIPTION OF THE DRAWINGS

A component or a feature that is common to more than one drawing is indicated with the same reference number in each of the drawings.

DESCRIPTION OF THE INVENTION

Figure 1:
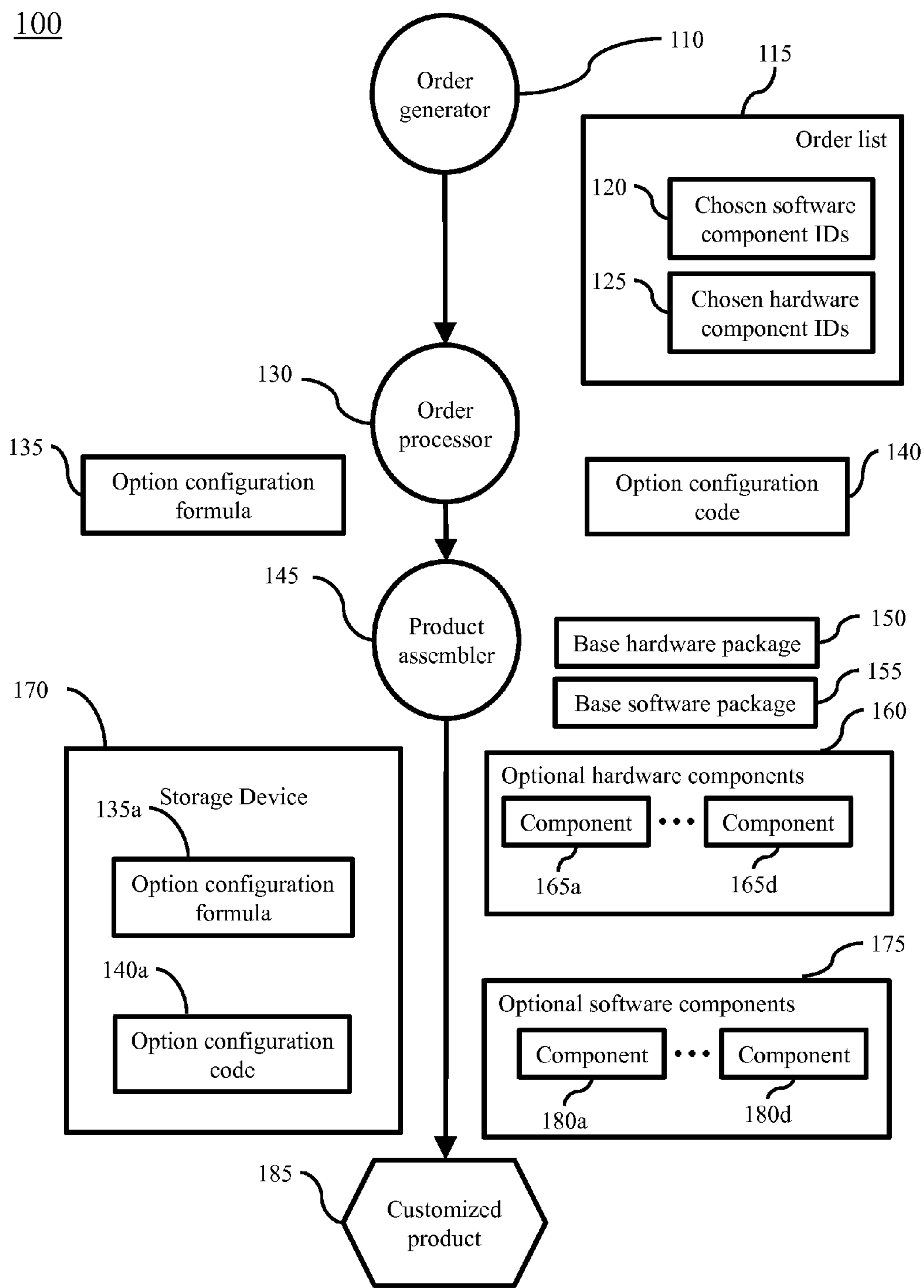
FIG. 1 is a functional block diagram of a method for producing a customized product.

FIG. 1 is a functional block diagram of a method 100 for producing a customized product 185. Method 100 involves operations being performed by three actors, namely an order generator 110, an order processor 130, and a product assembler 145. Each of order generator 110, order processor 130, and product assembler 145 can be either a human being or a machine, e.g., a computer or a robot.

Customized product 185 includes some standard hardware components, designated as a base hardware package 150, and some standard software components, designated as a base software package 155. Customized product 185 may also include one or more optional hardware components 160, and one or more optional software components 175. In practice, customized product 185 may include any desired number of optional hardware components 160 and optional software components 175. However, for the exemplary representation of customized product 185 being presented herein, optional hardware components 160 include components 165*a*, 165*b*, 165*c* and 165*d*, and optional software components include components 180*a*, 180*b*, 180*c* and 180*d*. Customized product 185 also includes a storage device 170, the significance of which is described below.

Order generator 110 generates an order list 115, e.g., a bill of materials, that lists components to be included in customized product 185. To identify which of optional hardware components 160 will be included in customized product 185, in order list 115, order generator 110 includes chosen hardware component IDs 125. To identify which of optional software components 175 will be included in customized product 185, in order list 115, order generator 110 includes chosen software component IDs 120.

Order processor 130 receives order list 115, processes order list 115 in accordance with an option configuration formula 135, and generates a configuration code, i.e., an option configuration code 140.

Option configuration code 140 is a data element that indicates which of optional hardware components 160 and optional software components 175 will be installed in customized product 185. The format of option configuration code 140 may be as simple as a flag word in which each bit is a flag having a value of either 0 or 1, at a particular position in the flag word, and indicates a presence or an absence of a particular component. Alternatively, option configuration code 140 may be in an encrypted format, an encoded format, or a compressed format.

Option configuration formula 135 is a representation of data that indicates how to interpret option configuration code 140. For example, in a case where option configuration code 140 is a flag word, option configuration formula 135 may be as simple as a field definition for option configuration code 140 that defines the significance of each flag. Alternatively, option configuration formula 135 may be a lookup table, an encryption/decryption formula, an encoding/decoding formula, or a compression/decompression formula. Given option configuration formula 135, order processor 130, as mentioned above, generates option configuration code 140. Similarly, given option configuration formula 135 and option configuration code 140, product assembler 145 can determine which of optional hardware components 160 and optional software components 175 will be installed in customized product 185.

Product assembler 145 receives option configuration formula 135 and option configuration code 140, and as mentioned above, utilizes option configuration formula 135 to determine, from option configuration code 140, which of optional hardware components 160 and optional software components 175 will be installed in customized product 185, thus yielding a determination. Accordingly, product assembler 145 assembles customized product 185, and based on the determination, installs the desired optional hardware components 160 and optional software components 175.

As mentioned above, customized product 185 includes storage device 170. To storage device 170, product assembler 145 writes option configuration formula 135 and option configuration code 140. When written to storage device 170, option configuration formula 135 and option configuration code 140 are designated herein as option configuration formula 135*a* and option configuration code 140*a*, respectively.

An exemplary embodiment of storage device 170 is a non-volatile memory device, i.e., a memory device that can retain stored information even when not powered, e.g., a read-only memory in an integrated circuit. Storage device 170 may be implemented as a plurality of storage components where, for example, option configuration formula 135*a* is written to a first storage component, and option configuration code 140*a* is written to a second storage component.

Figure 2:
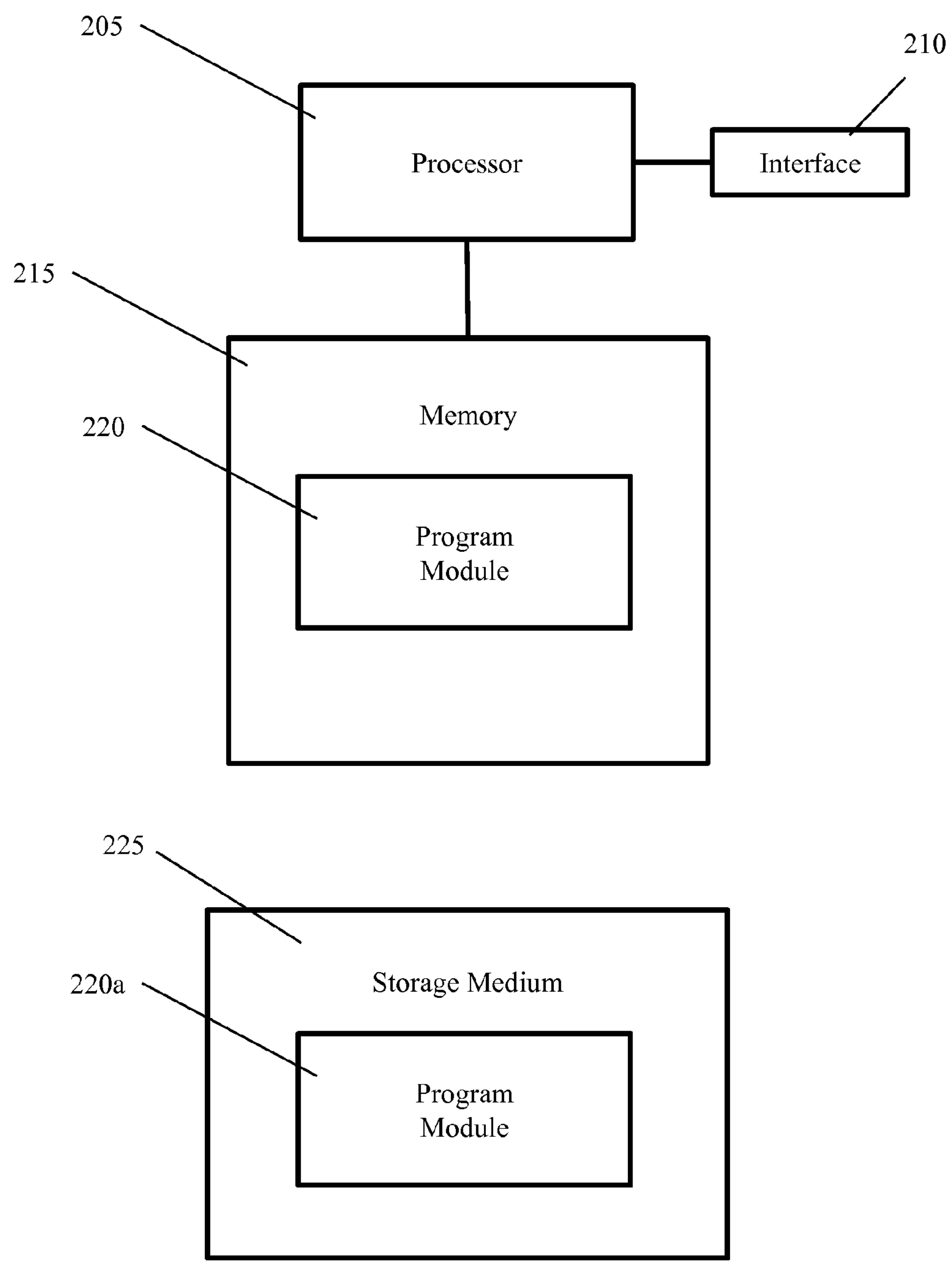
FIG. 2 is a block diagram of a subsystem of a product assembler, for a case where the product assembler is implemented as a computer or a robot.

FIG. 2 is a block diagram of a subsystem 200 of product assembler 145, for a case where product assembler 145 is implemented as a computer or a robot. Subsystem 200 includes a processor 205, a memory 215, and an interface 210.

Processor 205 is configured of logic circuitry that responds to and executes instructions.

Memory 215 is a tangible computer-readable storage medium that stores data and instructions that are readable and executable by processor 205 for controlling the operation of processor 205. Memory 215 may be implemented in a random access memory (RAM), a hard drive, a read only memory (ROM), or a combination thereof. One of the components of memory 215 is a program module 220.

Program module 220 contains instructions for controlling processor 205 to execute methods employed by product assembler 145. For example, under control of program module 220, processor 205 (i) installs an optional component into customized product 185, and (ii) to storage device 170, writes option configuration formula 135 and option configuration code 140. The term "module" is used herein to denote a functional operation that may be embodied either as a stand-alone component or as an integrated configuration of a plurality of sub-ordinate components. Thus, program module 220 may be implemented as a single module or as a plurality of modules that operate in cooperation with one another. Moreover, although program module 220 is described herein as being installed in memory 215, and therefore being implemented in software, it could be implemented in any of hardware (e.g., electronic circuitry), firmware, software, or a combination thereof.

Interface 210 is communicatively coupled to processor 205 and provides a channel through which processor 205 can communicate with a device (not shown) such as a user interface or another processor. For example, by way of interface 210, from order processor 130, processor 205 can receive option configuration formula 135 and option configuration code 140. Interface 210 may be embodied as a connector or a wireless interface.

Although subsystem 200 is described herein as having program module 220 installed into memory 215, program module 220 can be embodied on a storage medium 225, for subsequent loading into memory 215. Storage medium 225 is a tangible computer-readable storage medium. Program module 220, when embodied on storage medium 225, is designated as program module 220*a*. Examples of storage medium 225 include a compact disk, a magnetic tape, a read only memory, an optical storage media, a hard drive or a memory unit consisting of multiple parallel hard drives, and a universal serial bus (USB) flash drive. Alternatively, storage medium 225 can be a random access memory, or other type of electronic storage device, located on a remote storage system and coupled to subsystem 200 via a data communication network (not shown).

As mentioned earlier, each of order generator 110 and order processor 130 could also be implemented as a computer or a robot. As such, order generator 110 and order processor 130 would include a subsystem similar to that of subsystem 200, where program module 220 controls processor 205 to perform operations of order generator 110 and order processor 130. When order generator 110, order processor 130, and product assembler 145 are implemented as computers, they can be communicatively coupled to one another, through their respective interfaces 210, via a data communication network (not shown).

Figure 3:
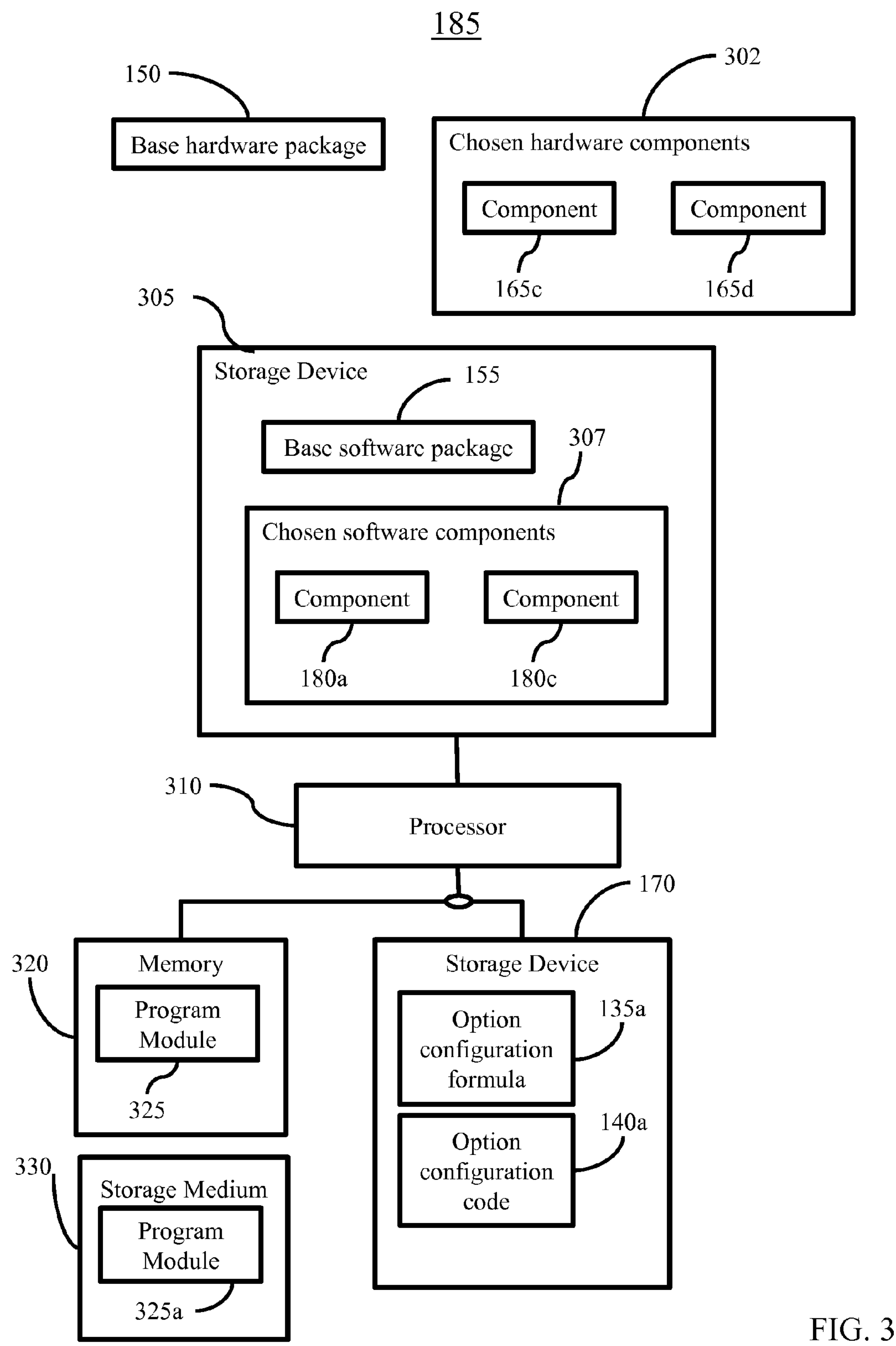
FIG. 3 is a block diagram of an exemplary embodiment of a customized product.

FIG. 3 is a block diagram of an exemplary embodiment of customized product 185. In this embodiment, customized product 185 includes base hardware package 150, a storage device 305 that includes base software package 155 installed therein, a processor 310, a memory 320, and storage device 170.

Recall that product assembler 145 may install one or more optional hardware components 160 into customized product 185. The installed optional hardware components 160 are designated as chosen hardware components 302, and in the present example, two such components, namely component 165*c* and component 165*d* are shown as having been installed.

Recall that product assembler 145 may install one or more optional software components 175 into customized product 185. The installed optional software components 175 are designated as chosen software components 307, and in the present example, two such components, namely component 180*a* and component 180*c*, are shown as having been installed. Chosen software components 307 are installed into storage device 305.

Storage device 170 holds option configuration formula 135*a* and option configuration code 140*a*. Assume, for example, that customized product 185 could be assembled to include various combinations of components 165*a*, 165*b*, 165*c*, 165*d*, 180*a*, 180*b*, 180*c* and 180*d*, and that option configuration formula 135*a* is a field definition as shown below in TABLE 1, which indicates that an individual bit having a value of either 0 or 1, at a particular position in option configuration code 140*a*, indicates a presence or an absence of a particular component.

TABLE 1

| Exemplary Option Configuration Formula 135a | | | | | | | |
|---|---|---|---|---|---|---|---|
| 165a | 165b | 165c | 165d | 180a | 180b | 180c | 180d |

Here, for example, option configuration formula 135*a* defines the leftmost bit of option configuration code 140*a* as an indicator of the presence or absence of component 165*a*, and the rightmost bit of configuration code 140*a* as an indicator of the presence or absence of component 180*d*. Accordingly, since customized product 185 includes components 165*c*, 165*d*, 180*a* and 180*c*, option configuration code 140*a* would have a value of 00111010.

Processor 310 is configured of logic circuitry that responds to and executes instructions. Such instructions may be found, for example, in program modules that reside in base software package 155 and chosen software components 307.

Memory 320 is a tangible computer-readable storage medium that also stores data and instructions that are readable and executable by processor 310 for controlling the operation of processor 310. Memory 320 may be implemented in a random access memory (RAM), a hard drive, a read only memory (ROM), or a combination thereof. One of the components of memory 320 is a program module 325.

Program module 325 contains instructions for controlling processor 310 to execute methods employed by customized product 185. For example, under control of program module 325, processor 310 (i) reads option configuration formula 135*a* and option configuration code 140*a* from storage device 170, (ii) determines from option configuration code 140*a*, whether any optional hardware components 160 or optional software components 175 are installed in customized product 185, thus yielding a determination, and (iii) executes an operation in accordance with the determination. As mentioned earlier, the term "module" is used herein to denote a functional operation that may be embodied either as a stand-alone component or as an integrated configuration of a plurality of subordinate components. Thus, program module 325 may be implemented as a single module or as a plurality of modules that operate in cooperation with one another. Moreover, although program module 325 is described herein as being installed in memory 320, and therefore being implemented in software, it could be implemented in any of hardware (e.g., electronic circuitry), firmware, software, or a combination thereof.

Storage device 170 stands apart from, i.e., is independent from, chosen hardware components 302 and chosen software components 307. As such, processor 310 can read option configuration code 140*a* without having to run any of chosen hardware components 302 or chosen software components 307.

While program module 325 is indicated as already loaded into memory 320, it may be configured on a storage medium 330 for subsequent loading into memory 320. Storage medium 330 is a tangible computer-readable storage medium that stores program module 325 thereon. Program module 325, when embodied on storage medium 330, is designated as program module 325*a*. Examples of storage medium 330 include a compact disk, a magnetic tape, a read only memory, an optical storage media, a hard drive or a memory unit consisting of multiple parallel hard drives, and a universal serial bus (USB) flash drive. Alternatively, storage medium 330 can be a random access memory, or other type of electronic storage device, located on a remote storage system and coupled to customized product 185 via a data communication network (not shown).

Figure 4:
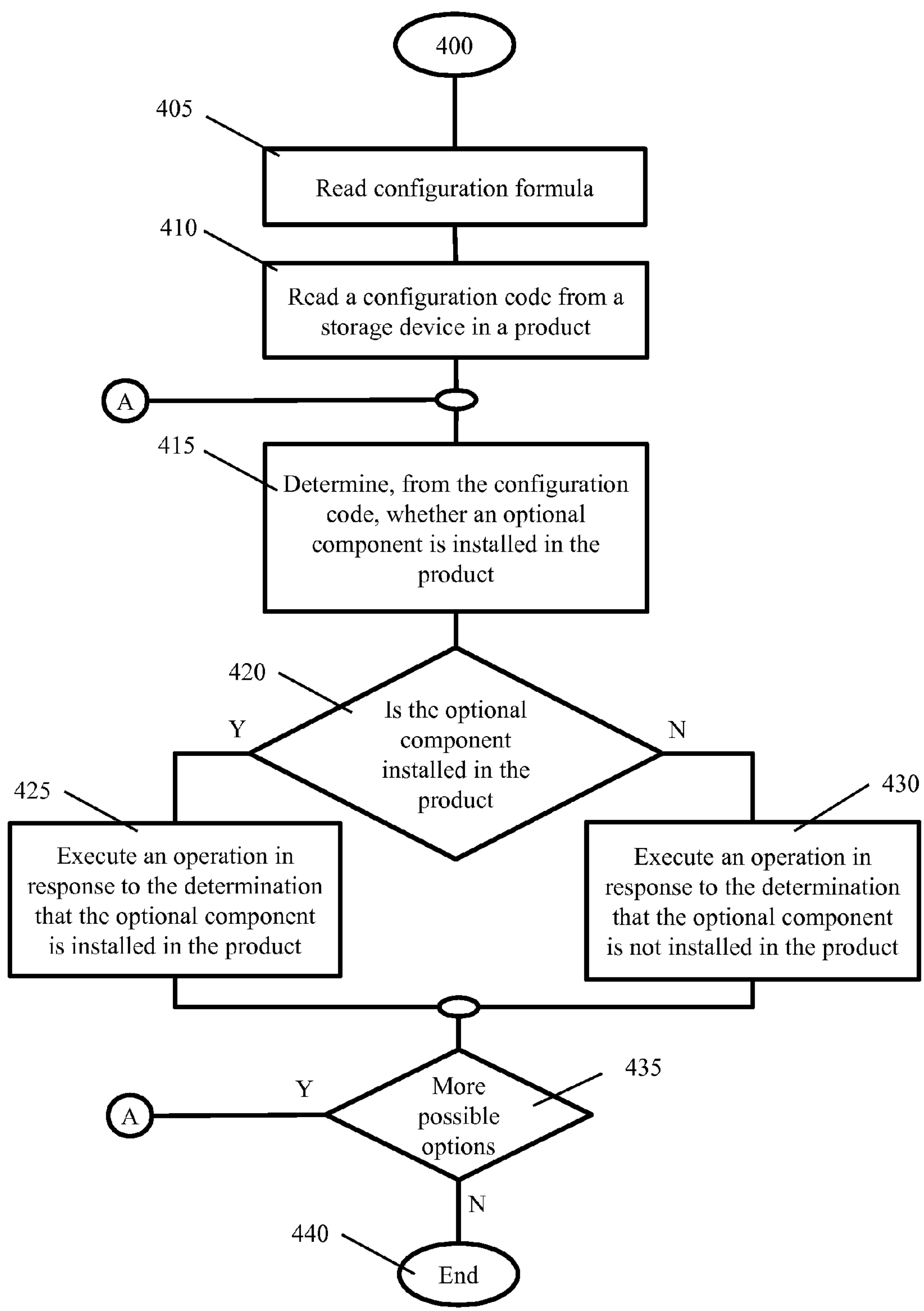
FIG. 4 is a flowchart of a method that is performed by a customized product, and more specifically a processor that is a component of the customized product.

FIG. 4 is a flowchart of a method 400 that is performed by customized product 185, and more specifically processor 310, in accordance with program module 325. Method 400 commences with step 405.

In step 405, processor 310 reads option configuration formula 135*a* from storage device 170. From step 405, method 400 progresses to step 410.

In step 410, processor 310 reads option configuration code 140*a* from storage device 170. From step 410, method 400 progresses to step 415.

In step 415, processor 310 utilizes option configuration formula 135*a* to determine, from option configuration code 140*a*, whether an optional component is installed in customized product 185. From step 415, method 400 progresses to step 420.

In step 420, if the optional component is installed in customized product 185, then method 400 progresses to step 425, and if the optional component is not installed in customized product 185, then method 400 progresses to step 430.

In step 425, processor 310 executes an operation in response to the determination that the optional component is installed in customized product 185. For example, processor 310 may execute a procedure to initialize the optional component. From step 425, method 400 progresses to step 435.

In step 430, processor 310 executes an operation in response to the determination that the optional component is not installed in customized product 185. For example, processor 310 may execute a procedure to advise another component that the optional component is not available. From step 430, method 400 progresses to step 435.

In step 435, processor 310 determines, by further examination of option configuration code 140*a* in accordance with option configuration formula 135*a*, whether there is another option to consider. If there is another option to consider, then method 400 loops back to step 415. If there is no further option to consider, then method 400 progresses to step 440.

In step 440, method 400 ends.

Since under control of program module 325, processor 310 can determine what options are installed in customized product 185, customized product 185 can reboot itself even in a case where customized product 185 includes optional components. Accordingly, advantages of customized product 185 include that it can be employed (a) in an environment where it is intended to run continuously, without human intervention, (b) in a location that is cost-prohibitive for a user to visit in order to reboot or configure customized product 185, and (c) in a location where access by a remote user is dependent on an active network link. Additionally, customized product 185 can read option configuration code 140*a* to ensure that customized product 185 executes, or does not execute, a software module based on the presence or absence of a component, either hardware or software, during either bootup or regular operation. An exemplary embodiment of customized product 185 is a computer device, such as a smart gird node, on an electric utility pole.

The techniques described herein are exemplary, and should not be construed as implying any particular limitation on the present disclosure. It should be understood that various alternatives, combinations and modifications could be devised by those skilled in the art. For example, steps associated with the methods described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method for facilitating self-booting of a customized product, the method comprising:

initiating a self-boot operation of the customized product that includes one or more optional components, wherein the customized product cannot identify the one or more optional components during the self-boot operation and the customized product is situated in a safety risk environment;

reading, by a processor of the customized product, a configuration code from a storage device that is included in the customized product, wherein said configuration code indicates whether a particular optional component is installed in said customized product;

determining from said configuration code whether said particular optional component is installed in said customized product, thus yielding a determination; and executing an operation in response to said determination, wherein the processor of the customized product executes a procedure to initialize the particular optional component responsive to the determination that the particular optional component is installed in the customized product.

2. The method of claim 1, further comprising:

reading from said storage device, data that indicates how to interpret said configuration code, wherein said determining utilizes said data.

3. The method of claim 1, wherein said storage device is a non-volatile memory device that stands apart from said particular optional component.

4. The method of claim 1, wherein the self-boot operation is performed by the customized product comprising a computer device that is configured to operate in one of an underwater location, an underground location, on an electric utility pole, and as a smart grid node.

5. A customized product comprising:

a processor;

a storage device that holds a configuration code that indicates whether one or more optional components are installed in the customized product;

and a memory that contains instructions that are readable by said processor and that control said processor to perform the following acts when a self-boot operation of the customized product is initiated, the customized product having one or more optional components, wherein the customized product cannot identify the one or more optional components during the self-boot operation and the customized product is situated in a safety risk environment:

read said configuration code from said storage device, wherein the configuration code is operative to indicate whether a particular optional component is installed in the customized product;

determine from said configuration code that said particular optional component is installed in said customized product, thus yielding a determination; and execute an operation in response to said determination, wherein the processor of the customized product executes a procedure to initialize the particular optional component responsive to the determination that the particular optional component is installed in the customized product.

6. The customized product of claim 5, wherein said storage device also holds data that indicates how to interpret said configuration code, and wherein said instructions also control said processor to utilize said data to make said determination.

7. The customized product of claim 5, wherein said storage device is a non-volatile memory device that stands apart from said particular optional component.

8. The customized product of claim 5, wherein the self-boot operation is performed by the customized product comprising a computer device that is configured to operate in one of an underwater location, an underground location, on an electric utility pole, and as a smart grid node.

9. A storage medium that is tangible and non-transitory, and comprises instructions that are readable by a processor of a customized product to cause said processor to perform the following acts when a self-boot operation of the customized product is initiated, the customized product having one or more optional components, wherein the customized product cannot identify the one or more optional components during the self-boot operation and the customized product is situated in a safety risk environment:

read a configuration code from a storage device that is included in the customized product, wherein the configuration code is operative to indicate whether a particular optional component is installed in the customized product;

determine from said configuration code that the particular optional component is installed in said customized product, thus yielding a determination; and execute an operation in response to said determination, wherein the processor of the customized product executes a procedure to initialize the particular optional component responsive to the determination that the particular optional component is installed in the customized product.

10. The storage medium of claim 9, wherein said instructions also control said processor to:

read from said storage device, data that indicates how to interpret said configuration code, wherein said instructions also control said processor to utilize said data to make said determination.

11. The storage medium of claim 9, wherein the self-boot operation is performed by the customized product comprising a computer device that is configured to operate in one of an underwater location, an underground location, on an electric utility pole, and as a smart grid node.

* * * * *